United States Patent [19]

Koo et al.

[11] Patent Number: 5,283,650
[45] Date of Patent: Feb. 1, 1994

[54] SYSTEM FOR GHOST CANCELLATION COMPRISING AN IMPROVED GCR SIGNAL SEQUENCE

[75] Inventors: David Koo, Briarcliff Manor; Craig B. Greenberg, Mohegan Lake, both of N.Y.; Takashi Sato, Tokyo, Japan

[73] Assignee: North American Philips Corporation, New York, N.Y.

[21] Appl. No.: 941,356

[22] Filed: Sep. 4, 1992

Related U.S. Application Data

[63] Continuation-in-part of Ser. No. 676,927, Mar. 8, 1991, Pat. No. 5,161,017, and a continuation-in-part of Ser. No. 831,600, Feb. 5, 1992, Pat. No. 5,179,444, which is a continuation of Ser. No. 698,521, May 10, 1991, Pat. No. 5,121,211.

[51] Int. Cl.⁵ .................... H04N 7/08; H04N 5/14; H04N 5/208; H04N 5/213
[52] U.S. Cl. ........................ 348/614; 375/13
[58] Field of Search ............... 358/167, 166, 187, 905, 358/36, 37; 455/65; 375/13, 19; H04N 5/14, 5/208, 5/213, 5/38, 7/08

[56] References Cited

U.S. PATENT DOCUMENTS

| | | | |
|---|---|---|---|
| 4,047,224 | 9/1977 | Yamaguti | 358/166 |
| 4,393,397 | 7/1983 | Holmes | 358/905 |
| 5,117,291 | 5/1992 | Ardekani et al. | 358/187 |
| 5,121,211 | 6/1992 | Koo | 358/187 |
| 5,184,221 | 2/1993 | Nishi et al. | 358/167 |

*Primary Examiner*—James J. Groody
*Assistant Examiner*—Glenton B. Burgess
*Attorney, Agent, or Firm*—Michael E. Marion

[57] ABSTRACT

A system for improved ghost cancellation for use in particular in television receivers. The system featuring a superior ghost cancellation reference (GCR) signal which exhibits improved performance in noisy environments and which exhibits the flat and wide bandwidth necessary for effective channel characterization which also exhibiting a higher and more evenly distributed amplitude versus time characteristic than that provided by known, non-cyclic ghost cancellation signals. The GCR signal is encoded a selected television line of an eight field sequence of lines however the polarity of the GCR signal is reversed selectively from field to field prior to inserting it in respective television lines. At a decoder or television receiver incorporating the invention, the selected television lines are combined in a manner which provides for both a robust received GCR value and cancellation of the effects of pair-wise constant television line signals on the GCR signals.

4 Claims, 2 Drawing Sheets

SYSTEM FOR GHOST CANCELLATION COMPRISING AN IMPROVED GCR SIGNAL SEQUENCE

This application is a continuation-in-part of U.S. Ser. No. 676,927, filed on Mar. 8, 1991, now U.S. Pat. No. 5,161,017 and a continuation-in-part of U.S. Ser. No. 831,600, filed on Feb. 5, 1992 now U.S. Pat. No. 5,179,444 which is a continuation of 698,521, filed May 10, 1991 which issued as U.S. Pat. No. 5,121,211. The contents of these applications are incorporated by reference herein.

BACKGROUND OF THE INVENTION

In 1979, the IEEE published an article which has become a basic reference in the field of television echo (or "ghost") elimination. The article is entitled "A Tutorial On Ghost Cancellation In Television Systems" and was written by Walter Ciciora, Gary Sgrignoli and William Thomas and it is incorporated by reference herein.

Although the Ciciora article described the fundamental principles, apparatus and algorithms applicable to ghost cancellation, the state of the art has only recently progressed to the point of providing practical ways to implement and improve these basic concepts.

There are two main steps to the ghost cancellation process. First the characteristics of the communications path or channel (which include the echo artifacts, if any) must be determined at the receiver. Once the channel characteristics are calculated, filters are used to implement the inverse channel characteristics to substantially eliminate the ghosts.

A straight forward approach to determining the characteristics of a transmission path is to transmit a ghost cancellation reference signal (GCR) over the path. The originally transmitted GCR signal is compared with the received, and "ghosted", GCR signal, and a model of the characteristics of the communications path is developed based on the comparison.

U.S. Pat. No. 5,121,211 describes an improved ghost cancellation reference signal and a system utilizing such a signal for cancelling ghosts. The GCR signal described in the '211 patent is transmitted on a single line of the vertical blanking interval of the television signal. One feature of this GCR signal is that it has a higher energy level with peaks more evenly distributed in time than other GCR signals which have been proposed such as the BTA GCR signal. The '211 GCR thus provides the flat, wide frequency spectrum necessary to fully characterize the path and has a high energy level (amplitude) and a more even distribution of energy over a time interval.

Parent application '927, describes an improved ghost cancellation circuit which comprises FIR and IIR filters which operate at a higher speed by reducing the time in which it takes to generate the appropriate filter coefficients. As discussed in that application, proposals have been made to transmit a GCR signal in one line of each field in an eight field sequence. The received GCR signals from the eight fields are averaged at the receiver and the average value of the received GCR is then compared with the stored reference GCR in the receiver's ghost cancellation circuit in order to derive the necessary filter coefficients for characterizing the channel. By using a value avereaged over a given number of fields, variations which take place within each individual field are minimized and a more accurate representation of the channel can be provided.

The path characterization process can be hindered due to the presence of sync and color burst signals present on a television line in close proximity to the GCR signal. Ghosted versions of these signals can overlap the portion of the received television line containing the GCR. DC level shifts can cause further distortion to the received GCR signal. The BTA of Japan has developed a method which seeks to eliminate the effects of these signals and their ghosts on the received GCR signal. U.S. Pat. No. 5,130,799 describes a system and method for ghost cancellation using this type of eight field sequence.

Since the color burst signal changes phase by 180° from frame to frame, the color burst signal will be at the same phase in lines four fields, or two frames, apart. The BTA method suggests using an eight field sequence wherein four fields are transmitted with a television line comprising a GCR signal, and four fields are transmitted with a television line without the GCR signal. At the receiver, lines of the sequence received four fields apart, and having color burst signals of opposite phase, are subtracted from each other. This combination yields a GCR signal value averaged over the eight fields, unaffected for the most part by the ghosts caused by the color burst signal. In addition, this subtraction eliminates the DC drift, sync signals and other types of pair-wise constant reference or test signals present on one or more lines adjacent to the line chosen to provide the GCR signal. The term "pair-wise constant" will be used herein to refer to signals which are constant on lines a fixed number of fields apart, for example four fields apart.

In accordance with the BTA sequence, the GCR signal is actually transmitted only in four of the eight television lines of the sequence and thus the average GCR signal value which is used to characterize the path at the receiver is limited somewhat in robustness. In addition, the sequence and apparatus described by the '799 patent is not useful in cancelling the effects of test signals which are not pair-wise constant, in otherwords signals which change in between fields, or signals which do not appear in pairs of lines within the sequence, for example teletext and SID signals.

It is therefore an object of the instant invention to provide a method and apparatus for minimizing or eliminating the effects of pair-wise constant television line signals as well as those non-pair-wise line signals which may appear in within each sequence of fields.

Another object of the invention is to provide a more robust GCR signal thus improving the signal to noise ratio of the ghost cancellation system.

SUMMARY OF THE INVENTION

The instant invention comprises a method and apparatus for transmitting and processing at a receiver, a multifield sequence of television lines, each field comprising a GCR signal. The use of all of the fields of the eight field sequence of the preferred embodiment to transmit the GCR signal described in the '211 patent, yields as a net result at the receiver or decoder, a received GCR signal value with at least about a 26 dB improvement in robustness over the average GCR value calculated using the four field BTA approach.

A feature of one embodiment of the instant invention is that the sequence utilizes a pattern whereby GCR signals on different television lines are encoded and/or are transmitted with different respective polarities, and that at the receiver, the television lines are combined with each other so that the effects of pair-wise constant line signals are minimized.

Another feature of one embodiment of the invention is that at the receiver, selected television lines carrying the effects of ghosted non pair-wise test signals, such as teletext or SID, can be ignored in calculating the received GCR value thus minimizing their effects on the GCR signal valve.

PREFERRED EMBODIMENTS OF THE INVENTION

Unlike the sequence proposed by BTA and described above, one preferred embodiment of the instant invention proposes encoding each television line of an eight field sequence of lines with a GCR signal, and reversing the polarity of the GCR signals selectively prior to inserting them in respective television lines, so that at a decoder or TV receiver, they can be processed further in accordance with the invention, as described below.

Figure 1:
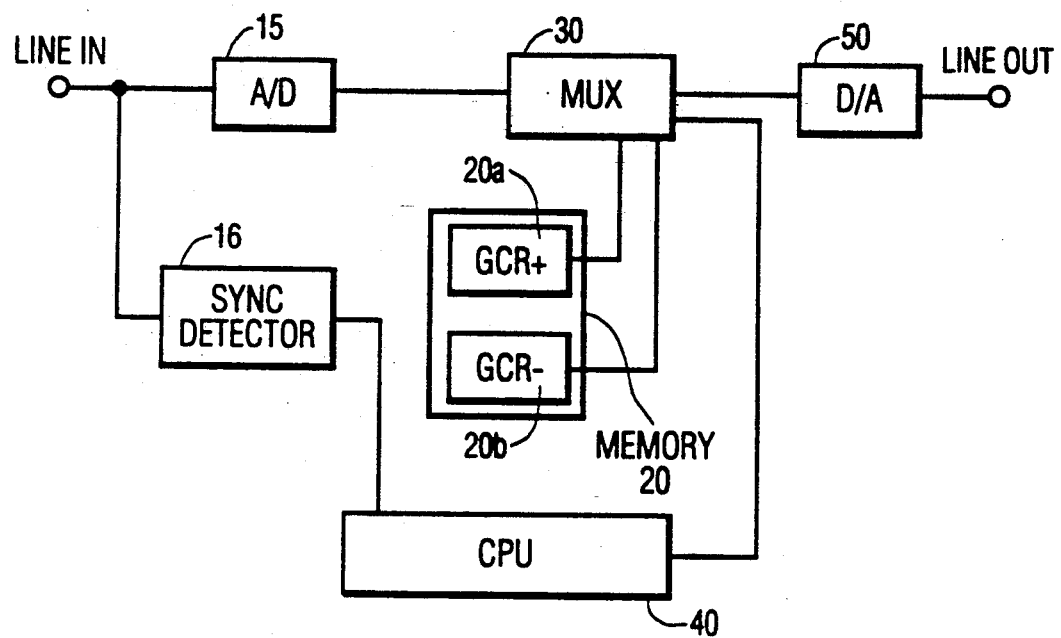
FIG. 1 is a block diagram of an encoder which can be used to insert the GCR within each of a sequence of television lines in accordance with the invention.

FIG. 1 describes an apparatus which can be used to encode an eight field sequence of television lines in accordance with the invention. In accordance with a preferred embodiment of the invention, a selected line (for example line nineteen) of each field of a television signal is digitized in analog to digital converter 15 and the GCR signal described in the '600 parent application and the '211 patent, with either a positive polarity (GCR+), or a negative polarity (GCR−) is placed on the television line by multiplexer 30. The positive and negative GCR signals are stored, in digital form, in memory means 20, for example ROMs 20a and 20b respectively.

Table I illustrates an example where two pair-wise constant line signals A and B cause ghosts which interfere with (i.e. overlap with) the ghosted GCR in the television line of each field of the eight field sequence of television lines. As shown in column 2, in field numbers 1,3,6 and 8 the GCR-signal is multiplexed as part of each respective nineteenth television line, and in field numbers 2,4,5, and 7 the GCR+ signal is multiplexed as part of each respective nineteenth television line. CPU 40 can be programmed to select either 20a or 20b to be combined with the appropriate television line of the sequence using the counter within the CPU 40. The sync signal detector 16, is used in conjunction with the CPU to detect the appropriate line of each field (i.e. line nineteen). The output of multiplexer 30 is then converted to an analog signal in digital to analog converter 50 and transmitted as the television line signal.

It is well within the capabilities of those skilled in the programming art to provide the CPU 40 with the necessary microcode to perform the above described operations.

At the transmitter, only the polarity of the GCR signal itself, of each selected line is subject to change prior to transmission of the line. All pair-wise constant line signals (i.e. sync or color burst signals or DC level shifts) present on the television line retain their normal polarity

TABLE I

| col. 1<br>Field<br>number | col. 2<br>Transmitted<br>GCR polarity | col. 3<br>Processed<br>GCR polarity | col. 4<br>Test signal<br>(received) | col. 5<br>Processed<br>test signal |
|---|---|---|---|---|
| 1 | − | + | A | −A |
| 2 | + | + | B | B |
| 3 | − | + | A | −A |
| 4 | + | + | B | B |
| 5 | + | + | A | A |
| 6 | − | + | B | −B |
| 7 | + | + | A | A |
| 8 | − | + | B | −B |
| SUM values | | 8* GCR | | 0 |

Figure 2:
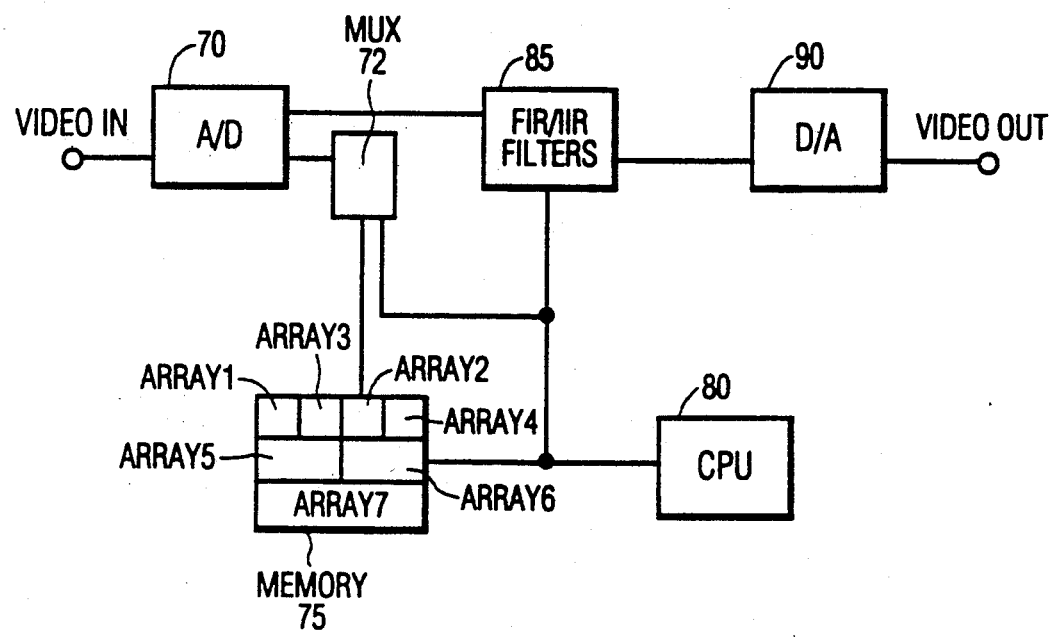
FIG. 2 is a block diagram of a decoder incorporating the invention.

FIG. 2 is a block diagram of a portion of a decoder comprising the invention which can be used, for example in a television receiver or a CATV or DBS headend (not shown). As described by column 3 of Table I, before performing the path characterization and cancellation functions utilizing FIR/IIR filters 85 as described more completely in the references incorporated herein, the decoder combines the received selected television lines of each field of the sequence to provide a GCR signal value which is then compared to a GCR reference value stored in ROM, for example within the CPU 80. The deghosted video is converted back to an analog signal in digital to analog converter 90 and is then provided as video out to the balance of the receiver circuitry for display or recording. The manner in which the eight selected television lines are combined also serves to cancel the effects of the pair-wise constant test signals present within the sequence.

As will be described below, the eight selected lines are combined so that those television lines having a first polarity GCR signal (i.e. GCR+) are added to form a SUM value, and those television lines having a GCR signal with the opposite polarity (i.e. GCR−) are subtracted from the SUM value. The combination will result in a SUM GCR value of 8 * GCR (column 3 of Table I) and the cancellation of the effects of pair-wise constant test signals (labelled A and B) present on these lines and/or causing ghosting to the respective received GCR signals (as shown in columns 4 and 5 of Table I). In otherwords, and for example, each received line having a GCR signal GCR+ is added to the SUM value (which is reset to zero every eight fields) and each received line having a GCR signal GCR− is subtracted from the SUM value. Those television lines having pair-wise constant test signal effects of opposite polarity to their respective GCR signal are thus effectively reversed in polarity when combined.

In accordance with a preferred embodiment of the invention, memory 75 is divided into seven arrays labelled ARRAY1, ARRAY2, ARRAY3, ARRAY4, ARRAY5, ARRAY6 and ARRAY7. Under the control of the CPU 80, each nth line of each field of an m field sequence is sent via multiplexer 72 to the sequentially addressed arrays, after it has been digitized in analog to digital converter 70. In a preferred embodiment, n and m are integers and m is equal to eight and n is equal to nineteen.

The multiplexer adds each 19th television line of fields 1,2,3,and 4 to arrays ARRAY1 - ARRAY4 respectively, and subtracts each 19th television line of fields 5,6,7,and 8 from arrays ARRAY1−ARRAY4 respectively. The pair-wise constant line signals appearing on the television lines respectively combined in each array are thus subtracted and are effectively eliminated from the total line value of each respective array. On the other hand, the respective GCR values of each line are accumulated as follows. For example, GCR− from field 1 is added to ARRAY1 and four fields later GCR+ from field 5 is subtracted from ARRAY1, thus ARRAY1=(GCR−)$_{field\ 1}$−(GCR+)$_{field\ 5}$=2GCR−. Similarly, ARRAY2=(GCR+)$_{field\ 2}$−(GCR−)$_{field\ 6}$=2 GCR+; ARRAY3=(GCR−)$_{field\ 3}$−(GCR+)$_{field\ 7}$=2GCR−; and ARRAY4=(GCR+)$_{field\ 4}$−(GCR−)$_{field\ 8}$=2GCR+.

The four arrays are then combined to form two further arrays, ARRAY5 and ARRAY6. Although any pair of arrays can be combined, for this example we will combine ARRAY1 and ARRAY3 to form ARRAY5, and ARRAY2 and ARRAY4 to form ARRAY6.

Since each of arrays, ARRAY1−ARRAY4 will have a total GCR value which is either positive or negative, the values in each respective array must be further processed to determine whether to add them together (if their polarities are the same) or subtract them (if their polarities are opposite). Subtracting array values which are of opposite polarity results in their addition thus avoiding the undesired cancelling out of both values.

Sum and difference power values are calculated for each pair of arrays to be combined. For example, in determining ARRAY5, a power value (PA) is calculated for arrays ARRAY1 and ARRAY3 according to the following formula:

PA=Σ (ARRAY1$_j$−ARRAY3$_j$)$^2$ where j=1 to n of the n elements in each array (where n is an integer); and a power value (PB) is calculated for arrays ARRAY1 and ARRAY3 according to the following formula:

PB=Σ (ARRAY1$_j$−ARRAY3$_j$)$^2$ where j=1 to n of the n elements in each array.

If PA is greater then PB, than ARRAY5=ARRAY1+ARRAY3. If on the otherhand PB is greater than PA, than ARRAY5=ARRAY1−ARRAY3).

In determining ARRAY6, a power value (PC) is calculated for arrays ARRAY2 and ARRAY4 according to the following formula:

PC=Σ (ARRAY2$_j$+ARRAY4$_j$)$^2$ where j=1 to n of the n elements in each array; and a power value (PD) is calculated for arrays ARRAY2 and ARRAY4 according to the following formula:

PD=Σ (ARRAY2$_j$−ARRAY4$_j$)$^2$ where j=1−n of the n elements in each array.

If PC is greater then PD, than ARRAY6=ARRAY2+ARRAY4. If on the otherhand PD is greater than PC, than ARRAY6=ARRAY2−ARRAY4).

ARRAY5 and ARRAY6 are then combined to form a single ARRAY7 in the same manner that arrays ARRAY1 and ARRAY3, and ARRAY2 and ARRAY4 are combined. Power values PE and PF, for the sum and difference of their respective array elements are calculated as described above. If PE is greater than PF, then ARRAY7=ARRAY5+ARRAY6. If PF is greater than PE, then ARRAY7=ARRAY5−ARRAY6.

As described in Table I, the combination of the array values in this manner results in a SUM GCR value equal to the ghosted GCR signal value taken over eight lines during the eight field sequence (8*GCR).

As further illustrated by Table I, the accumulation of television lines in arrays ARRAY1−ARRAY 4, provides for the cancellation of the effects of the pair-wise test signals.

For field number 1 the transmitted polarity of the GCR signal is negative (GCR−). Due to the presence of signal A on the same or an adjacent line, a ghost of signal A is present and superimposed on the GCR signal of field number 1 As described above, the television line of field 1 carrying the GCR signal with a first polarity, will be added to array ARRAY1. Four fields later however, in field 5, the GCR signal is transmitted with the opposite polarity (GCR+) and therefore, its television line is subtracted from array ARRAY1. Since, however, pair-wise constant signal A is transmitted in field 5 with the same polarity as in field 1 (see column 4 of Table I), the subtraction from ARRAY1 results in a reversal in polarity to test signal A of field 5 (see column 5) thereby cancelling the effects of these signals to the respective GCR value.

The net result over the eight field sequence, as shown in the bottom row of Table I, is that the average ghosted GCR value can be calculated over eight fields rather than over four fields as described in the prior art, thus providing a more robust received GCR value to compare with the stored GCR reference for path characterization purposes. This effectively improves the performance of the ghost cancellation system. At the same time, the effects of ghosts caused by pair-wise constant signals are cancelled over the eight field sequence.

It is to be understood that although the example described in Table I assigns a negative polarity to the GCR in fields 1,3,6 and 8, the negative polarity could have been assigned instead to the GCRs in fields 2,4,5,and 7, with the GCRs in fields 1,3,6 and 8 having a positive polarity. As long as the line signals present are pair-wise constant, the desired result will be achieved over an even number of fields, and it will not matter at which number field in the sequence, the capture and processing begins as long as a complete cycle of fields are processed.

It is also to be noted that the effects of non pair-wise constant signals, for example teletext and SID signals, can also be eliminated by ignoring those arrays in which such non-pairwise signals appear, in the combining of arrays described above.

The purpose of combining arrays 1, 2, 3, 4 is to improve the signal to noise ratio. For various reasons it may not be desirable to use all four arrays. Arrays 1, 2, 3, 4, 5, 6 can be used in replacement of array 7 with the primary difference being the signal to noise ratio. One reason could be implementation complexity. Another may relate to the properties of the previous and following lines of the transmitted signal. Some arrays may have the property of constant signals on neighboring lines while others may not. Under some circumstances it may be desirable to use only the arrays that have constant signal on neighboring lines. An example of this is when a changing data signal is sent on one field in the video while the other field has a constant signal.

The foregoing disclosure and description of the invention is illustrative and explanatory thereof and various changes in the methods and apparatus indicated herein may be made within the scope of the appended claims without departing from the spirit of the invention.

We claim:

1. A method for substantially eliminating ghosts occuring during the transmission of a television signal whereby a reference signal is transmitted over a transmission path as part of a selected line of each of a sequence of fields of said television signal, and whereby said selected lines of said sequence are received by a decoder and used to provide a received reference signal value which is used by said decoder to characterize the transmission path, the method comprising the steps of:
   a) providing a sequence of encoded television lines as an input to said transmission path by inserting said reference signal on the selected line of each of a first group of said sequence of fields at a first polarity, and inserting said reference signal on the selected line of each of a second group of said sequence of fields at a second polarity opposite to that of said first polarity;
   b) receiving each of said encoded television lines; and
   c) accumulating on a field by field basis said received encoded television lines so as to obtain a sum value by adding each respective received television line having said first polarity and subtracting each respective received television line having said second polarity, so as to cancel the effects of pair-wise constant line signals present in pairs of said received television lines and so as to provide said received reference signal value from said sum value.

2. A decoder for substantially eliminating ghosts occurring during the transmission of a sequence of fields of a television signal over a communications path, said sequence comprising a first group of fields each having on a selected television line, a reference signal having a first polarity, and a second group of fields each having on said selected line, said reference signal having a second polarity opposite to said first polarity, said decoder comprising:
   a) means for receiving each of said selected television lines;
   b) means for accumulating on a field by field basis each of said received television lines so as to obtain a sum value by adding each respective received television line having said first polarity and subtracting each respective received television line having said second polarity, so as to cancel the effects of pair-wise constant line signals present in pairs of said received television lines and so as to provide a received reference signal value from said sum value; and
   c) means for comparing said received reference signal value to a stored reference value to characterize the communications path.

3. The method of claim 1 wherein a first field, a third field, a sixth field and an eighth field of an eight field sequence have selected television lines of said first polarity, and a second field, a fourth field, fifth, and a seventh field of said eight field sequence have selected television lines of said second polarity.

4. An apparatus for substantially eliminating echoes occurring during the transmission of a signal over a transmission path, wherein said signal comprises a reference signal, said apparatus comprising:
   a) means for receiving said signal and for separating therefrom said reference signal as distorted by said transmission; and
   b) means for deriving from said received reference signal a sequence of coefficients to be used with at least one filter;
   wherein said reference signal is non-cyclic, has a substantially flat frequency response within the bandwidth of said transmission path, and a plurality of substantially uniform amplitude peaks over a time interval and wherein said reference signal is present on a selected line of each of a sequence of fields with a first polarity on a first group of fields of said sequence, and is present on said selected line of a second group of fields of said sequence with a second polarity opposite to said first polarity.

* * * * *